Nov. 21, 1950 G. W. GILMAN 2,530,957

TIME DIVISION SYSTEM FOR MODULATED PULSE TRANSMISSION

Filed April 5, 1947

INVENTOR
G. W. GILMAN
BY George C. Lord
ATTORNEY

Patented Nov. 21, 1950

2,530,957

UNITED STATES PATENT OFFICE 2,530,957

TIME DIVISION SYSTEM FOR MODULATED PULSE TRANSMISSION

George W. Gilman, Summit, N. J., assignor to Bell Telephone Laboratories, Incorporated, New York, N. Y., a corporation of New York Application April 5, 1947, Serial No. 739,719

5 Claims. (Cl. 179—15)

Figures 1, 2, 3:
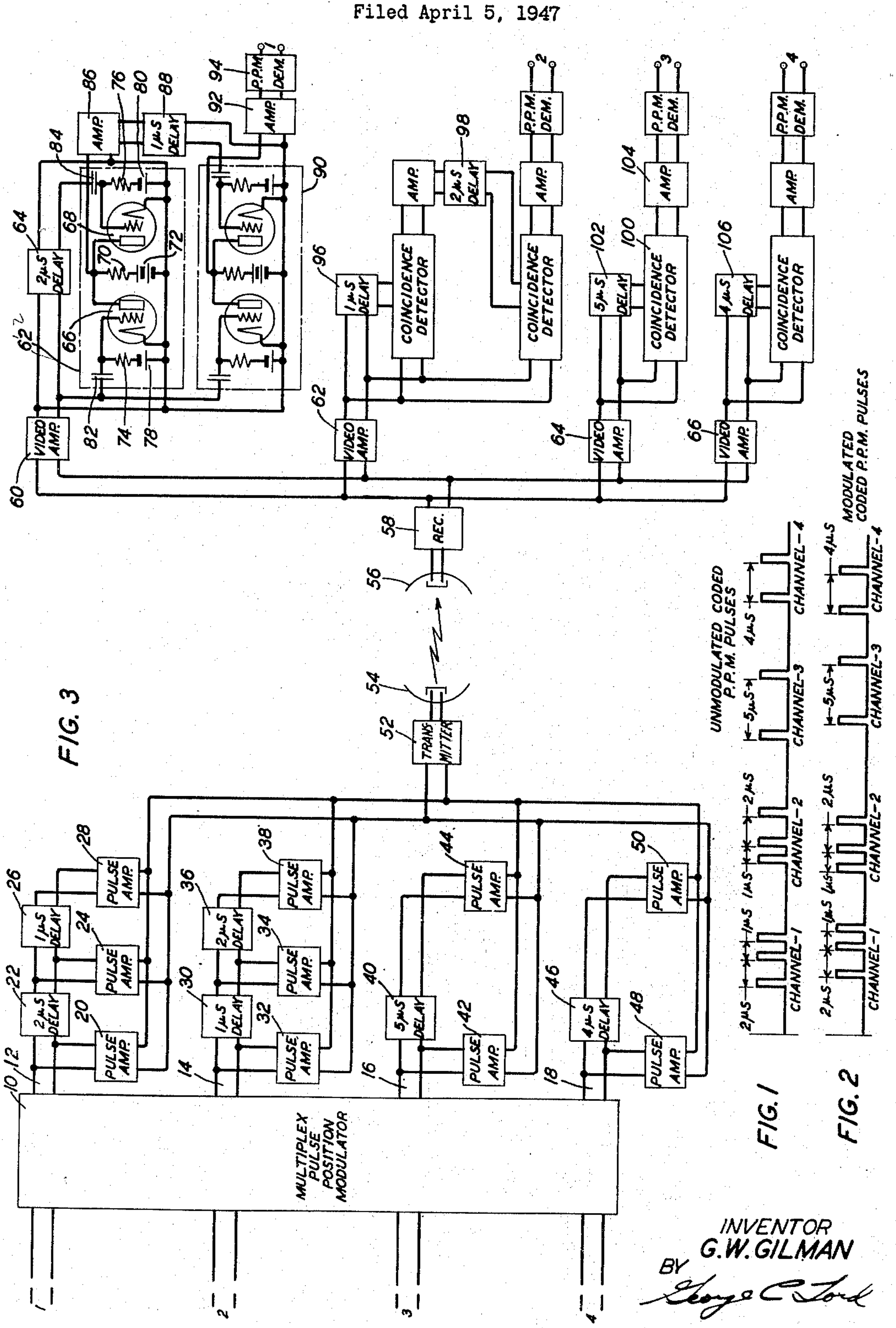

This invention relates to pulse transmission systems and particularly to systems for communicating by pulse modulation, either of the single channel or time-division multiplex types.

In pulse modulation systems a signal to be transmitted is employed to vary or modulate some characteristic of the pulses of a series of recurrent pulses.

It is usual to employ a single communication link for the transmission of a plurality of messages by the pulse modulation method through the application of the principle of time division multiplex. For this purpose, additional series of pulses are interposed in the intervals between the pulses required for the transmission of a single message. Thus, for example, if it is desired to send four separate messages using pulse modulation on a time division basis, the pulses of three additional series are interposed between the individual pulses of the series required for the transmission of one message. The group of four pulses representing one sample of each of the four message channels is often referred to as a "frame."

In multiplex systems of this type relatively complex circuits have been required at the receiving station to distribute the inter-laced pulses of the several messages to the appropriate output circuits and to synchronize the operation of the receiving equipment with that of the transmitting equipment to insure that such a distribution is maintained. Such circuits, of course, add to the complexity of the equipment and to a certain extent reduce its reliability since failure of the synchronizing circuit disrupts the entire system.

In pulse modulation systems, the receiving apparatus is made responsive to the variations in the characteristic of the pulses produced at the transmitter. It will be understood, therefore, that noise conditions due to atmospheric disturbances or other causes may result in pulse-like bursts of energy which may produce distortion or other types of failure by causing false operation of the receiving equipment.

Accordingly, it is an object of the invention to provide a pulse transmission system in which the channel or message pulses are readily distinguishable from other pulses or from noise.

Another object of the invention is to facilitate the separation of pulses in time division multiplex systems which employ separate pulses for transmitting different information or intelligence.

A further object of the invention is to substantially eliminate inter-channel crosstalk or noise in multichannel pulse communication systems.

Additional objects of the invention are to provide a pulse modulation communication system which is relatively unaffected by pulses of the type encountered in random noise, and to provide a multichannel pulse modulation system which does not require the use of synchronized circuits at the receiving station.

Considering the invention as applied to a pulse transmission system of the time division multiplex type, each of the signals or messages to be transmitted is caused to modulate the pulses of one series of a number of interlaced series of recurrent pulses. Each of the individual pulses of each series is then replaced by a sequence of pulses arranged in accordance with a different time code, all of the pulses of each sequence being modulated together in the same fashion as the single pulse which they replace.

At the receiver, the sequences are applied to selection or separation circuits which are respectively responsive only to sequences of the corresponding time code employed at the transmitter. Each of these separation circuits rejects, or produces no output for, pulse sequences arranged according to time codes other than that for which it is designed. Similarly, the separation circuits produce no output in response to random pulses such as those produced by atmospheric conditions.

The invention is shown and described herein by way of a specific example as applied to a four-channel time division multiplex system employing pulse position modulation. In this method of modulation, the instantaneous amplitude of each message signal is sampled and the sampled amplitude in each instance is employed to control the time of occurrence of the individual pulses of a pulse series, the pulse series for the several messages being interlaced to permit the use of time division multiplex.

The above and other features of the invention will be further described in the following detailed description taken in connection with the drawings, in which:

Figs. 1 and 2 are diagrammatic representations taken on a common time base of typical pulse sequences for a four-channel multiplex system and show the sequences without and with position modulation, respectively; and Fig. 3 is a block schematic diagram of a communication system in accordance with the invention.

In accordance with the invention and as pointed out above, the pulses of each of the pulse series are replaced by sequences of pulses spaced according to a time code, a different code being employed for the series of sequences for each message channel. A frame of pulse sequences for a four-channel system is shown in Fig. 1, the sequences for channels 1 and 2 each comprising three pulses while those for channels 3 and 4 each comprise two pulses. This particular arrangement of sequences is used by way of illustration but is not necessarily the most desirable for all applications. Bearing in mind that multipulse sequences occupy channel time which might otherwise be employed for additional message channels, it is desirable to attain the maximum possible number of sequences for a given overall sequence length. In general this may best be accomplished by using the same number of pulses in each of the sequences.

A time division multiplex system based on the four-channel sequences shown in Figs. 1 and 2 is shown in Fig. 3. Messages from channels 1, 2, 3 and 4 are applied to time division multiplex and pulse position modulator unit 10 which may be similar to the equipment shown in Deloraine Patent No. 2,262,838, issued November 18, 1941. In units of this type a series of pulses is provided for each individual channel and the several series are relatively displaced in time in such a way that the individual pulses of the several series are interlaced and all of the pulses sent over a common communication link. Message signals in the channels are effective to vary or modulate the positions or times of occurrence of the pulses in the corresponding series of pulses and the pulse position modulated series of pulses for message channels 1, 2, 3 and 4 appear on leads 12, 14, 16 and 18, respectively. These pulses for each channel are applied to sequence generating circuits comprising delay networks and pulse amplifiers and arranged to produce a sequence of pulses, spaced in accordance with a desired time code, in response to each pulse appearing across the output leads of modulator 10 for the channel involved.

In message channel 1, for example, the sequence employed, as shown in Fig. 1 comprises three pulses, the first interpulse interval, measured between corresponding portions of the pulses being two microseconds and the second interval one microsecond. Accordingly, the pulses from output leads 12 of multiplex unit 10 are applied to a pulse amplifier 20 and to a two-microsecond delay network 22 which may be of the type disclosed in the patent to Smith 2,403,561, July 9, 1946 or in "Wave Forms," volume 19, Radiation Laboratories Series, chapter 22, sections 28 and 29. Conveniently, all of the delay lines employed in this embodiment of the invention may be of the same type, differing only in electrical length. The delayed pulses from network 22 are applied to a pulse amplifier 24 and to a one-microsecond delay network 26. The delayed pulses from network 26 are applied to a pulse amplifier 28 and the output circuits of pulse amplifiers 20, 24 and 28 are connected in parallel. Thus for each pulse appearing at the output 12 of multiplex unit 10 a sequence of three pulses spaced as shown in Fig. 1, channel 1, will be produced across the common output circuit of pulse amplifiers 20, 24 and 28. In this sequence, a single pulse will occur at the time of the pulse at terminals 12. This will be followed after two microseconds by a second pulse which in turn will be followed after one microsecond by a third pulse. Thus each position modulated pulse occurring at the output of the multiplex unit is converted into a sequence of the type shown in Fig. 1 for channel 1. Since the time of occurrence of the sequence is determined by the single pulse applied to the delay circuits, the sequences are position modulated in the same way as the single pulses from which they are produced.

The equipment for generating the sequences for channels 2, 3 and 4 in response to the single pulses appearing at outputs 14, 16 and 18 of multiplex unit 10 is generally similar to the equipment which has already been described. Thus, for channel 2, the pulses at output 14 are applied to a one-microsecond delay network 30 and a pulse amplifier 32. The pulses from delay network 30, delayed one microsecond with respect to the pulses at the output 14 of multiplex unit 10, are applied to pulse amplifier 34 and a two-microsecond delay network 36 and the output pulses from this delay network are applied to pulse amplifier 38. The outputs of amplifiers 32, 34 and 38 are connected in parallel and in parallel with the output of the sequence generating circuits of channel 1.

In similar fashion the pulse sequences for channel 3 are generated from the single pulses at the output 16 of the multiplex unit by application to a five-microsecond delay network 40 and pulse amplifier 42. The delayed pulses from delay network 40 are applied to a pulse amplifier 44 and the parallel outputs of the two pulse amplifiers are connected in parallel with each other and with the outputs of the sequence generating equipment for channels 1 and 2.

The sequence of pulses for channel 4 are generated by equipment substantially identical to that described above for channel 3 and includes a delay network 46 and pulse amplifier 48 and 50. This equipment differs from that for channel 3 only in that delay network 46 introduces a delay of four microseconds.

Since the interlaced series of pulses appearing at outputs 12, 14, 16 and 18 of multiplex unit 10 are separately time position modulated in accordance with the messages in the four channels, the sequences produced by the circuits just described are correspondingly time position modulated, the pulses of any sequence being identically displaced. Fig. 1 indicates the appearance of a single frame of pulse sequences for the four channels without modulation, while Fig. 2 shows the same sequences for the four channels, assuming different conditions of modulation in each channel.

The pulse sequences for the several channels are applied in parallel to a transmitter 52, in which a train of radio frequency oscillations is generated in response to each pulse. These trains are transmitted from an antenna 54 to the receiving station where they are received by a second antenna 56. At the receiving station the trains of radio frequency oscillations are detected in receiver 58 which operates in conventional fashion and the resulting sequence pulses are applied in parallel to video amplifiers 60, 62, 64 and 66. The output pulses of each of the video amplifiers are applied to a combining or selecting circuit which acts to produce an output pulse whenever a sequence having pulses spaced in accordance with the proper predetermined time code is applied thereto and to produce no output in response to sequences of other code arrangements.

The circuits shown for purposes of illustration in Fig. 3 effectively perform this function by combining the pulses of a sequence of the proper type in two steps. For this purpose, the output of video amplifier 60 is applied to one input of a coincidence detector 62 and to a delay network 64 which serves to delay the pulses of the sequence by two microseconds, this delay being equal to the first time interval of the sequence shown for channel 1 in Figs. 1 and 2. The delayed sequence from network 64 is applied to the other input of coincidence detector 62.

Coincidence detector 62 may be of the type described at pages 61 and 62 of "Electrical Counting" by W. B. Lewis, Cambridge 1942. As applied here, this circuit comprises a pair of vacuum tubes 66 and 68 which may conveniently be of the triode type. The anodes of these vacuum tubes are connected together and through a common load resistor 70 of relatively high resistance to the positive terminal of anode battery 72, the cathodes of the two tubes being connected together and to the negative terminal of the same battery. The grids of the two tubes are connected respectively through resistors 74 and 76 and bias batteries 78 and 80 to the negative terminal of battery 72, and input signals from video amplifier 60 and delay circuit 64 respectively are applied to the grids of vacuum tubes 66 and 68 through coupling capacitors 82 and 84.

The bias potentials from batteries 78 and 80 are such that the internal resistances of tubes 66 and 68 are low compared to that of the common resistor 70. Under normal conditions, then, the anode potential of the tubes will be low as compared to the potential of anode battery 72. The negative pulses from video amplifier 60 or from delay circuit 64 are effective to cut off the flow of current through tubes 66 and 68, respectively but so long as one of these tubes does not receive such a negative pulse the anode potential must remain low as compared to that of battery 72. If a negative pulse applied directly from video amplifier 60 coincides with a negative pulse from delay circuit 64, however, the anodes of both tubes rise to the battery potential and a relatively large positive pulse will appear across load resistor 70. In the absence of such coincidences the pulses across resistor 70 are much smaller. Pulses appearing across load resistor 70 are applied to an amplifier 86 which is responsive only to the large pulses produced when a coincidence occurs. This amplifier is arranged to produce negative output pulses. Thus, if pulse sequences of the time spacing shown in Fig. 1 appears at the output of video amplifier 60, a single pulse of negative polarity will appear at the output of amplifier 86 in response to each received sequence. If on the other hand the pulse sequences have other spacings such that no coincidences can occur after a two-microsecond delay, there will be no output from amplifier 86.

The single negative pulse from amplifier 86 is applied to a second delay circuit 88 which introduces a delay of one microsecond, this corresponding to the second time interval of the pulse sequence for channel 1 of Fig. 1. The delayed pulse is applied to one input of a second coincidence detector 90 which is identical in all respects to coincidence detector 62, while the output from video amplifier 60 is also applied to the other input of coincidence detector 90. The output signals of coincidence detector 90 are applied to a second amplifier 92 which is responsive to input pulses of the amplitude produced by coincidences in coincidence detector 90. The single pulse which appears at the output of amplifier 92 is indicative of the reception of a sequence, the pulses of which are spaced in accordance with the particular time code for which this receiving equipment is designed.

Since the positions of all of the pulses of a sequence are modulated together, it will be understood that pulses which appear at the output of amplifier 92 are time position modulated in the same fashion. These pulses are applied to a pulse position demodulator 94 which may conveniently be of the type disclosed in Deloraine Patent 2,262,838 referred to above.

The separation circuits for channel 2 are identical in all respects to those in channel 1 with the exception that delay network 96, corresponding to delay network 64 introduces a delay of one microsecond, while delay network 98, corresponding to delay network 88, introduces a delay of two microseconds. Thus, if a pulse sequence coded for channel 1 is applied to the separation circuit for channel 2 no coincidences between delayed and undelayed sequences can occur and there will be no output. Conversely, the pulse sequences for channel 2 are not so coded as to produce an output from the channel 1 separation circuits.

The separation circuits for channels 3 and 4 are somewhat simpler than those for channels 1 and 2 because of the smaller number of pulses employed in the corresponding sequences but the various elements making up the circuits are essentially identical in their operation to those described in connection with channel 1. Thus in channel 3 the negative sequences from video amplifier 62 are applied to one input of a coincidence detector 100 and through a five-microsecond delay network 102 to the other input of the same coincidence detector. Amplifier 104 is responsive only to inputs of the amplitude produced by coincidence detector 100 when coincidence of input pulses occur and it will be understood that the sequences of channels 1 and 2 having no interpulse time equal to five microseconds will be ineffective to produce any output in channel 3. Similarly, the two- and one-microsecond delays of channel 1 and the one- and two-microsecond delays of channel 2 are such that the two pulse sequences of channel 3 which are separated by five microseconds can produce no coincidences and therefore no output in channels 1 and 2.

The separation circuit for channel 4 is identical to that for channel 3 with the exception that the delay network 106 corresponding to delay network 102 introduces a delay of only four microseconds. In this case also, none of the pulse sequences employed for the other channels can produce any output since none of them include an interval between any pulses equal to four microseconds.

From the above description it will be understood that the pulse sequences of the four channels of Fig. 3 which are applied in parallel to the four separation circuits are effective to produce responses only in the separation circuits designed respectively to receive them. Thus separation of the channels of the multiplex is effected without the use of any timing or synchronizing equipment at the receiver.

Separation circuits at the receiver and sequence generating circuits at the transmitter may be added to the system of Fig. 3 as required to increase the number of channels, the limit of the number of channels being determined by the pulse time and the channel space available for the multiplex system. In each instance, the various sequences must be so chosen that none of the interpulse intervals for the channels employing the larger number of pulses per sequence are equal to the interpulse intervals of channels employing sequences of smaller numbers of pulses.

The separation of the several message signals at the receiver of a time division multiplex system in accordance with the invention has been described above. It will be recognized that this separation is effected solely by the operation of selective circuits, each of which is responsive to the signals of a particular message channel and that synchronized gate or distributor circuits are not required.

A further benefit obtained in multichannel systems according to the invention is found in the elimination of interchannel crosstalk. This follows directly from the method of channel separation employed since interfering signals from one channel will not produce a response in any other channel unless the pulses comprising such signals are spaced in accordance with the same time code as the pulses of the sequences intended for that channel.

A considerable reduction in interference by atmospheric noise or other noise introduced in the communication link is also obtained and this reduction is effected in either single or multichannel systems employing time-coded pulse sequences according to the invention. In general, such noise is of random character and will be rejected by the separation circuit at the receiver, which will admit it only when the spacing between recurrent noise bursts is the same as that of the time code employed. A single channel system may, for example, employ a pulse sequence such as that shown for channel 1 of the four channel system described above. Signals from a pulse position modulator similar to one channel of modulator 10 may be applied to a delay network identical to that for channel 1 to obtain the time coded sequences at the transmitter while at the receiver a coincidence detector identical to detector 62 (and 90) of the 4-channel system and a pulse position demodulator such as 84 may be employed. The coincidence detector separation circuit will reject random noise and also signals from other pulse transmission systems not employing the same time code, thus greatly enhancing single channel performance.

What is claimed is:

1. The method of selectively receiving pulses transmitted as recurrent sequences, each sequence comprising a plurality of pulses according to an assigned time code determined by the number and spacing of the pulses, which comprises subjecting each received sequence to a delay corresponding to the first time interval of said time code, comparing the delayed and undelayed sequences and producing a pulse corresponding to coincidences of pulses of the delayed and undelayed sequences, delaying the pulse so produced by an interval corresponding to the next time interval of said code, comparing the delayed pulse with the original sequence and producing a pulse for each coincidence of said produced pulse and the pulses of the original sequence, and utilizing only the last-produced pulse.

2. A receiver for selectively receiving pulses transmitted as recurrent sequences each comprising a plurality of pulses in accordance with an assigned time code determined by the number and spacing of the pulses, means for subjecting the pulses of each transmitted sequence to a delay corresponding to the first time interval of said code, a coincidence detector for comparing the delayed and undelayed sequences and producing a pulse whenever pulses of said delayed and undelayed sequence coincide, coincidence detectors for each succeeding time interval of said code, means for delaying the produced pulses from the preceding coincidence detector in each case by an amount corresponding to the next time interval of said code, means for applying said delayed pulses to the next coincidence detector for comparison with the undelayed pulse sequence, and means for utilizing the pulses produced by the last of said coincidence detectors.

3. In a communication system, means at the transmitter for producing recurrent sequences of pulses, each sequence comprising a plurality of pulses in accordance with a time code determined by the number and spacing of the pulses, means for transmitting said pulse sequences, means at the receiver for subjecting the pulses of each transmitted sequence to a delay corresponding to the first time interval of said code, a coincidence detector for comparing the delayed and undelayed sequences and producing a new pulse whenever pulses of the delayed and undelayed sequences coincide, coincidence detectors for each succeeding time interval of said sequences, means for delaying the pulse output from each preceding coincidence detector by an amount corresponding to the next time interval of said code, means for applying such delayed pulse output to the next coincidence detector for comparison with the undelayed sequence, said coincidence detectors each producing a pulse output for each coincidence, and means for utilizing the pulse output from the last of said coincidence circuits.

4. In a communication system, means at the transmitter for producing recurrent sequences of pulses, each sequence comprising a plurality of pulses in accordance with a time code determined by the number and spacing of the pulses, means for simultaneously varying a characteristic of all the pulses in each sequence in accordance with intelligence to be transmitted, means for transmitting said pulse sequences, means at the receiver for subjecting the pulses of each transmitted sequence to a delay corresponding to the first time interval of said code, a coincidence detector for comparing the delayed and undelayed sequences and producing a pulse output whenever pulses of the delayed and undelayed sequences coincide, coincidence detectors for each succeeding time interval of said sequences, means for delaying the pulse output from each preceding coincidence detector by an amount corresponding to the next time interval of said code, means for applying such delayed pulse output to the next coincidence detector for comparison with the undelayed sequence, said coincidence detectors each producing a pulse output for each coincidence, and means for recovering the transmitted intelligence from the varied characteristic of the pulse output from the last of said coincidence detectors.

5. In a communication system, means at the transmitter for producing recurrent sequences of pulses, each sequence comprising at least three pulses separated by different time intervals in accordance with a time code, means for varying the time position of the pulses of each sequence as a group in accordance with a signal to be transmitted, means for transmitting said pulse sequences, means at the receiver for subjecting the pulses of each transmitted sequence to a delay corresponding to the first time interval of said code, a coincidence detector for comparing the delayed and undelayed sequences and producing a pulse output whenever pulses of the delayed and undelayed sequences coincide, coincidence detectors for each succeeding time interval of said sequences, means for delaying the pulse output from each preceding coincidence detector by an amount corresponding to the next time interval of said code, means for applying such delayed pulse output to the next coincidence detector for comparison with the undelayed sequence, said coincidence detectors each producing a pulse output for such coincidence, and means responsive to the pulse output from the last of said coincidence circuits for generating a signal corresponding to that applied at the transmitter.

GEORGE W. GILMAN.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,403,561 | Smith | July 9, 1946 |
| 2,412,974 | Deloraine | Dec. 24, 1946 |
| 2,428,118 | Labin | Sept. 30, 1947 |